United States Patent [19]

Tippmann

[11] 4,066,862
[45] Jan. 3, 1978

[54] METHOD OF BUILDING-UP A LAYER OF METAL ON A METAL SURFACE

[76] Inventor: Eugene R. Tippmann, 10120 Islepine Drive, Fort Wayne, Ind. 46815

[21] Appl. No.: 801,238

[22] Filed: May 27, 1977

[51] Int. Cl.² .............................................. B23K 9/00
[52] U.S. Cl. ................................................ 219/76.14
[58] Field of Search .................................. 219/76, 137

[56] References Cited

U.S. PATENT DOCUMENTS

| | | | |
|---|---|---|---|
| 1,807,477 | 5/1931 | Hume | 219/137 R |
| 2,250,561 | 7/1941 | Wissler | 219/76 |
| 2,427,517 | 9/1947 | Wilson et al. | 219/76 |
| 3,128,365 | 4/1964 | Schilberg | 219/76 |

Primary Examiner—J. V. Truhe
Assistant Examiner—John H. Bouchard
Attorney, Agent, or Firm—Joseph J. Baker; Gerald J. Ferguson, Jr.

[57] ABSTRACT

A method is disclosed for building up a layer of metal on a metal object which comprises the steps of: positioning a mold on the object having a cavity of the desired configuration of the layer to be formed; feeding a consumable filler electrode having a flux core into the mold cavity while providing an electric arc between the electrode and the object; cooling the mold to rapidly solidify the flux transferred from the core of the electrode to the cavity walls; and removing the mold when the molten metal solidifies.

1 Claim, 6 Drawing Figures

METHOD OF BUILDING-UP A LAYER OF METAL ON A METAL SURFACE

BACKGROUND OF THE INVENTION

This invention relates to welding methods and more particularly to a method of forming a very smooth and uniform layer of metal of a desired configuration and thickness on the surface of another metal object.

DESCRIPTION OF THE PRIOR ART AND OBJECTS

The broad concept of positioning a mold on a metal object and filling the mold by means of a consumable, electric arcing, metal electrode in order to build up a layer having a desired configuration is not new and is disclosed in U.S. Pat. No. 1,807,477 issued May 26, 1931 to W. R. Hume and U.S. Pat. No. 3,128,365 issued Apr. 7, 1964 to A. G. Schilberg as examples. The layer of metal resulting from practicing the methods disclosed in the aforementioned patents as well as the most currently used methods more often than not has objectionable blisters, projections, pockets or other irregularities on the surface of the layer. These irregularities may require the object to be discarded altogether or the expenditure of additional time, money, manpower and equipment to correct them by grinding off the projections, smoothing the surface or filling the pockets. Applicant's invention is based upon the discovery that by using a consumable metal electrode having a flux core rather than a coated flux electrode or separate flux-electrode combination, the flux will be caused to spatter against the sides of the mold cavity to form, upon rapid cooling, a ceramic-like shield which permits the smooth build-up of metal without the aforementioned irregularities or other flaws.

It is therefore the primary object of the present invention to provide a new welding method for building up a layer of metal of any desired thickness or configuration on the surface of another layer of metal or metal object.

It is another object of the present invention to provide such a welding method wherein the outer surface of the layer being deposited is free of any irregularities such as blisters, projections, pockets or other flaws thus obviating the necessity and expense of correcting such flaws.

It is a further object of the present invention to provide a welding method which utilizes a consumable metal electrode having a coaxial, longitudinally extending core of flux.

These and other objects and advatages will become apparent and better appreciated from a consideration of the following description of modes of carrying the invention out in practice taken in conjunction with the accompanying drawing in which.

DETAILED DESCRIPTION OF THE PREFERRED EMBODIMENT

Figure 1:
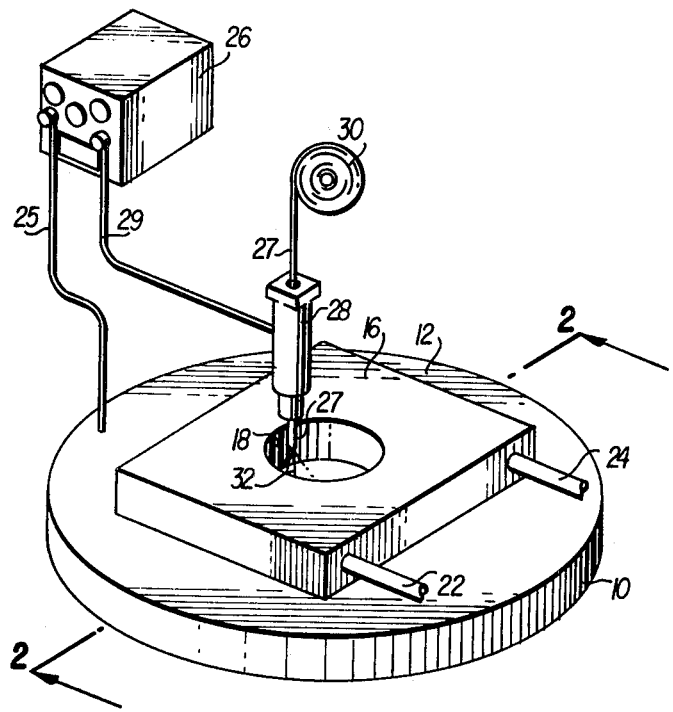
FIG. 1 is a schematic view illustrating a manner of carrying out the novel method of the invention.
Figure 2:
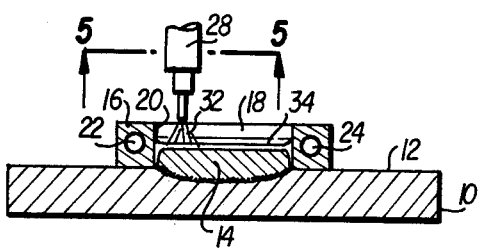
FIG. 2 is a cross-sectional view taken along the lines 2—2 of FIG. 1.
Figure 3:
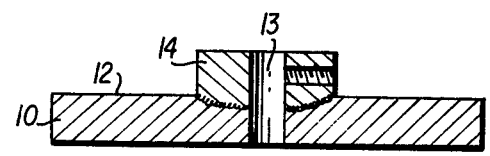
FIG. 3 is a cross-sectional view of a metal surface having a metal deposit thereon.
Figure 4:
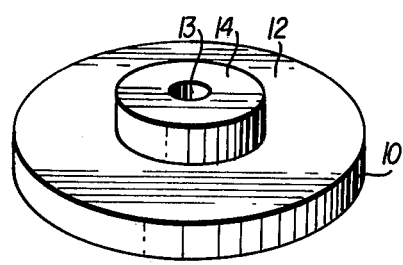
FIG. 4 is a perspective view of the metal surface and deposit of FIG. 3.
Figure 5:
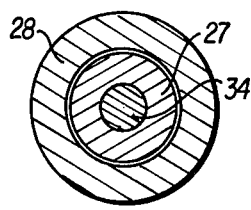
FIG. 5 is a cross-sectional view of the consumable filler wire having a flux core taken along the lines 5—5 of FIG. 2.

Referring to the drawing, the method of the invention is illustrated in connection with a metal object or plate 10 having a surface 12 upon which surface it is desired to deposit a mass of metal 14 of a particular configuration.

The object 10 may be, for example, a flat, circular metal disc such as a gear blank into the periphery of which teeth are to be cut and through the center of which is to be drilled 13 for inserting a shaft or the like. The metal deposition 14 may be an embossment cylindrical in shape and serving as a hub which can also be drilled 13 for mounting the finished gear on the shaft (not shown).

To form the mass of metal 14 into the desired shape, a mold element 16 having a cavity 18 therethrough is positioned on the surface 12 in the precise location. The cavity 18 has a wall 20 in the shape or desired configuration of the resulting deposited mass of metal. The mold 16 is preferably composed of copper or other material which has high heat dissipation characteristics. In order to be able to control the cooling rate of any hot material brought in contact with the wall 20 of cavity 18, a passage (not shown) is provided through the mold 16 having an inlet 22 and an outlet 24 for circulating a coolant such as cold water therethrough.

The object 10 is connected to one side 25 of a source of electrical current 26 and a fusible electrode 27 is connected to the other side 29 of the source of electrical current by means of a welding head 28. The welding head 28 can be of any conventional construction but should be such as to ensure good electrical contact between the lead 29 and the electrode 27 during automatic feed of the wire 27 and movement back and forth of the welding head 28. The fusible electrode 27 can be a hand held weldrod if the metal deposition 14 is very small such that the metal from a single weldrod is sufficient to provide it or if the metal deposition is larger, a continuous supply of wire-like weldrod from a coil 30 can be furnished. An arc 32 is struck between the weldrod 27 and the surface 12 at the base of cavity 18 to cause melting and deposition of the metal. The weldrod 27 is caused to be moved back and forth within the cavity 18 to completely fill it with arc deposited metal from the weldrod and this metal is, at the same time, fused with the metal of the plate 10 and the metal previously deposited by the arc.

Figure 6:
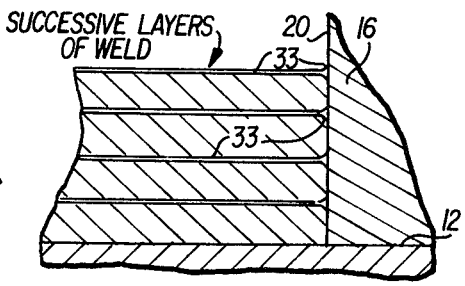
FIG. 6 is a graphic illustration of the pits, etc. formed on the outer surface of successive layers of deposited metal when other than the weldrod of the present invention is used.

In the absence of flux between the wall 20 of cavity 18 and the molten metal or weld, the outer surface of the metal deposition 14, i.e. that surface opposite the wall 20, will have pits, blisters and other irregularities 33 at the point on the surface where successive layers are deposited on each other to build up the weld, as can best be seen by referring to FIG. 6. These irregularities are not eliminated when flux is introduced into the mold cavity from a source independent of the weldrod during melting nor are the irregularities eliminated by using weldrod having the flux coated on the outside thereof. The pitting, blistering and other irregularities, applicant has discovered, are eliminated only when weldrod having flux 34 in the core thereof is used. This is believed to be due to the fact that the flux 34 from the center of the weldrod is caused to spatter under the intense heat of the electric arc. The flux 34 spatters against the copper wall 20 of the mold cavity 18 where, due to the cool nature of the mold 16, the hot flux is rapidly chilled to the solid state. The solidified flux 34 forms a ceramic-like shield on the mold wall 20 which permits successive passes or layers of weld to fuse together at the wall 20 leaving a perfectly smooth outer surface.

An example of a flux core electrode 27 which applicant has found to be effective in practicing his invention is called Fab CO 82 which, together with automatic weldrod feed equipment, is manufactured by the Hobart Brothers Company of Troy, Ohio. A non-oxidizing atmosphere can also be provided in the region of the arc 32 to ensure the highest quality weld deposit and strong union between the deposited metal 14 and the plate 10, as well as between successive layers of deposited metal 14.

While the invention has been particularly shown and described with reference to a preferred embodiment thereof, it will be understood by those skilled in the art that various changes in form and details may be made therein without departing from the spirit and scope of the invention.

What I claim is:

1. A method of building up a layer of metal on a metal object comprising the steps of:
    a. positioning a mold on said metal object in the area said layer of metal is to be deposited, said mold having a wall defining a cavity of the desired configuration of said metal layer,
    b. feeding a consumable filler wire having a core containing flux into said cavity of said mold in a predetermined manner while providing an electric arc between said wire and said metal object to melt said wire and transfer said flux to said walls of said cavity,
    c. cooliong said mold to rapidly solidify said flux transferred thereto to thereby form a smooth, ceramic-like shield between said walls and said molten metal, and
    d. removing said mold when said molten metal solidifies.

* * * * *